United States Patent [19]

Harpel et al.

[11] Patent Number: 4,504,395

[45] Date of Patent: Mar. 12, 1985

[54] PAINT SPRAY BOOTH DETACKIFICATION COMPOSITION AND METHOD

[75] Inventors: William L. Harpel, Langhorne; Richard J. Pilny, Warrington, both of Pa.

[73] Assignee: Betz Laboratories, Inc., Trevose, Pa.

[21] Appl. No.: 577,905

[22] Filed: Feb. 7, 1984

[51] Int. Cl.$^3$ .............................................. C02F 1/56
[52] U.S. Cl. ............................. 210/712; 106/287.17; 134/38; 55/84; 55/85; 210/702
[58] Field of Search ............... 106/287.17; 134/38; 210/704, 712, 702; 55/84, 85

[56] References Cited

U.S. PATENT DOCUMENTS

| | | | |
|---|---|---|---|
| 2,267,426 | 12/1941 | Saunders et al. | 106/287 |
| 2,362,964 | 11/1944 | Affeck | 427/212 |
| 2,585,407 | 2/1952 | Rives | 106/213 |
| 3,429,823 | 2/1969 | Cataneo | 252/170 |
| 3,515,575 | 6/1970 | Arnold et al. | 106/210 |
| 4,125,476 | 11/1978 | Dean | 252/115 |
| 4,185,970 | 1/1980 | Dean | 55/89 |
| 4,220,456 | 9/1980 | Block | 55/85 |
| 4,380,495 | 4/1983 | Maher | 210/728 |

FOREIGN PATENT DOCUMENTS 2052459 1/1981 United Kingdom .

OTHER PUBLICATIONS

Form Osha-20 (Mat'l Safety Data Sheet) "Sodium Montmorillonite", Benton Clay Co., Mills, WY, 1982.
Product Data+Mat'l Safety Data Sheets, "Macaloid" NL Chemicals, Hightstown, NJ, '81.
Mat'l Safety Data Sheet, "Hectorite", NL Chemicals, Hightstown, NJ, '81.
Kirk-Othmer, Encyclopedia of Chemical Technology, vol. 5, p. 544, (2nd edition), J. Wiley & Sons, NY, NY, 1964.
The Encyclopedia of Chemistry, 3rd ed., Van Nostrand Reinhold Co., NY, 1973, pp. 272-274.
Martin Barr, General Characteristics and Applications of the Montmorillonite Hydrocolloids, Am. Perfumer and Cosmetics, vol. 78, Feb. 1963.

Primary Examiner—Theodore Morris
Attorney, Agent, or Firm—Alexander D. Ricci; Bruce E. Peacock

[57] ABSTRACT

Paint spray booth detackification compositions and methods are disclosed. The compositions comprise a hectorite clay, an anti-foaming agent and optionally, an aluminum oxide material and a montmorillonite clay. These compositions are introduced into a paint spray booth water wash system so as to detackify oversprayed paint.

4 Claims, No Drawings

PAINT SPRAY BOOTH DETACKIFICATION COMPOSITION AND METHOD

FIELD OF THE INVENTION

This invention relates to an improved method and composition for treating paint wastes and paint oversprays encountered in paint spray booths or any areas where these wastes and oversprays exist.

BACKGROUND OF INVENTION

Spray painting of automobile bodies, truck engines, appliances, and other industrial goods is customarily carried out in enclosed areas called paint spray booths (PSB). These booths act both to contain any fumes or oversprayed paint and to reduce the chances of dust contamination. These booths vary in size, but are somewhat basic in their design and operation. A typical booth would thus consist of a work area, back section with mist eliminators, and a sump.

The units to be painted generally pass through the work area while an airflow makes the oversprayed paint contact either the sump water or the spray from the water curtain. The air is scrubbed with recirculated water at the water curtain, passes through the mist eliminators, and is removed by an exhaust fan.

Because roughly one-half of all paint sprayed does not reach its intended article, a significant concentration of paint builds in the system and agglomeration can occur. The resultant mass is a sticky, tacky material which can plug the mist eliminators, shower heads, and even recirculating pumps. When this happens, scrubbing efficiency decreases leading to potentially hazardous conditions of unchecked paint emissions being discharged into the atmosphere. Such conditions may also present severe safety hazards to paint spray booth operators.

This process involves other problems. These tacky organic deposits are subject to bacterial growth and fungii proliferation which conditions generate corrosion and odor problems. In addition, the paint solids which are recirculated can form suspensions in the water. They remain tacky and can create expensive separation and disposal problems.

These problems show, therefore, the desirability to treat PSB water systems so as to reduce or prevent as much as possible, the agglomeration and deposition of oversprayed paint on critical PSB operation parts; to render the resultant sludge non-tacky and easily removable; and to provide a water quality such that it can be recycled for use in the system.

PRIOR ART

Many compositions and methods have been tried in an effort to reduce these problems. One of the first of these processes is disclosed in U.S. Pat. No. 2,585,407. This disclosure acknowledges the then conventional practice of allowing the overspray to come in contact with water treated with caustic to a pH above 8. The paint eventually settles by gravity to the bottom of the sump where it is removed by shovelling the sticky residue from the sump. This method eventually was considered unacceptable and as a result, more sophisticated chemical treatments have been developed to separate the paint from the water and turn it into a non-tacky, or detackified, solid which does not cause the aforementioned problems.

The prior art is replete with such chemical treatment approaches. For instance, the use of a combination of esters of aliphati dibasic acids and bentonite clay is suggested in U.S. Pat. No. 2,362,964 (Affeck). Similarly, U.S. Pat. No. 3,515,575 (Arnold et al) discloses the use of talc, chalk, starch, bentonite, clay, colloidal silica, calcium silicate, magnesium silicate, aluminum silicate, antifoams in general, and polycationic or polyanionic polymers to perform the detackification function.

Other prior art patents disclosing the use of bentonite clays in this environment include U.S. Pat. Nos. 4,220,456 (Block); 2,267,426 (Saunders et al); 4,185,970 (Dean); 4,125,476 (Dean); and 4,380,495 (Maher).

Despite the advantages of the above-noted prior art approaches, the present inventors faced the problem of developing a versatile detackification product and method capable of performing the intended detackification function for a wide degree of paint products including water based paints, oil based paints, lacquers, enamels and the newer high solids paints.

In addition to finding a versatile detackifier composition and method, the inventors attempted to develop a detackifier that remained suspended in the wash water over a relatively long time period, in contrast to certain of the prior art montmorillonite and bentonite clay detackifiers which quickly separated from the wash water and hence could no longer fulfill the desirable detackifier function.

Of even further importance is the need for a detackification composition and method capable of performing adequately with the difficult to "kill" epoxy, amino resin, vinyl resin based paints, alkyd resin, urethane and acrylic paints.

These and other problems have been substantially minimized by the compositions and methods herein disclosed and claimed.

DETAILED DESCRIPTION

In accordance with the invention, it has been discovered that hectorite clay effectively detackifies water-based paints, oil-based paints, lacquers and enamels.

Paint is a broad-based term used to describe the coating applied to a given object. Paints are normally composed of a film former (the resin which forms the coating), a solvent or carrier (water or oil); pigments (for color), and additives such as biocides, drying agents, viscosity modifiers, etc. In general, the solvent is used to classify the paint type: either water base or oil base. Technically, if the paint forms its coating by evaporation of the solvent without chemical reaction, it is a lacquer. If the coating is formed via cross-linking, it is an enamel.

The term "clay" is unusual in that it has decidedly different meanings to technologists in different fields. One standard definition for the term is that of a "naturally occurring sediment (including that obtained by alteration in situ by supergene and hydrothermal processes) or sedimentary rock composed of one or more minerals and accessory compounds, the whole usually being rich in hydrated silicates of aluminum, iron or magnesium, hydrated alumina, or iron oxide, predominating in particles of colloidal or near-colloidal size, and commonly developing plasticity when sufficiently pulverized and wetted." Kirk-Othmer, *Encyclopedia of Chemical Technology*, Volume 5, page 544, (2nd edition) John Wiley and Sons, Inc., New York, N.Y. 1964.

The "montmorillonite" clays refer generically to crystalline clays having three layers. These clays are composed of units having two layers of silica tetrahedrons and one centrally disposed dioctahedral or trioctahedral layer. Such montmorillonite clays may be classified as either having an expanding lattice structure or a nonexpanding lattice. *The Encyclopedia of Chemistry*, (third edition), Van Nostrand Reinhold Co., New York, 1973.

The term "montmorillonite" has also been used to specify a species member of the "montmorillonite" genus; i.e., an aluminous member of the group accorded the empirical formula

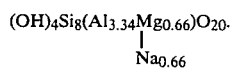

Both bentonite and hectorite are members of the expanding lattice montmorillonite subgenus. One difference between the two is that in hectorite, the aluminum present in the bentonite lattice is almost completely substituted by magnesium atoms. Another difference is that lithium and fluorine are absent from the bentonite lattice and present in the hectorite lattice. Bentonite may be characterized as a sodium aluminum silicate, with hectorite being a sodium magnesium-fluoro-litho silicate.

Hectorite has been given the empirical formula $[Mg_{2.67}Li_{0.33}(Na_{0.33})]Si_4O_{10}(OH, F)_2$.

One hectorite, which may be used in accordance with the invention is Capricorn H, Capricorn Chemicals. It has been reported to have the following analysis:

| Capricorn H HECTORITE | |
|---|---|
| Shape: | Elongate |
| Particle Size: (dispersed) | 0.8 × 0.89 × 0.0010 microns |
| Type: | Trioctahedral |
| Color: | White to Light Pink |
| Composition: | |
| Clay | 50.0% |
| Water | 6.1 |
| Quartz | 1.0 |
| Cristobalite | — |
| Calcite | 30.0 |
| Dolomite | 12.9 |
| Feldspar | — |
| Gypsum | — |
| Illite | — |
| | 100.0% |
| Oxide Analyses: | |
| $SiO_2$ | 55.86% |
| $Al_2O_3$ | 0.13 |
| $Fe_2O_3$ | 0.03 |
| FeO | — |
| MnO | None |
| MgO | 25.03 |
| CaO | Tr |
| $K_2O$ | 0.10 |
| $Na_2O$ | 2.68 |
| $Li_2O$ | 1.05 |
| $TiO_2$ | None |
| $CO_2$ | — |
| F | 5.96 |
| $H_2O-$ | 9.90 |
| $H_2O+$ | 2.24 |
| | 102.98% |

In contrast, Wyoming bentonite has been reported to have the following analysis:

| WYOMING BENTONITE | |
|---|---|
| Shape: | Equidimensional |
| Particle Size: (dispersed) | 0.8 × 0.8 × 0.0010 microns |
| Type: | Dioctahedral |
| Color: | Gray to Brown |
| Composition: | |
| Clay | 77.4% |
| Water | 7.9 |
| Quartz | 5.0 |
| Cristobalite | 0.7 |
| Calcite | — |
| Dolomite | — |
| Feldspar | 5.0 |
| Gyspum | 1.0 |
| Illite | 2.0 |
| | 100.0% |
| Oxide Analysis: | |
| $SiO_2$ | 55.44% |
| $Al_2O_3$ | 20.14 |
| $Fe_2O_3$ | 2.67 |
| FeO | 1.30 |
| MnO | — |
| MgO | 2.49 |
| CaO | 0.50 |
| $K_2O$ | 0.60 |
| $Na_2O$ | 2.75 |
| $Li_2O$ | — |
| $TiO_2$ | 0.10 |
| $CO_2$ | — |
| F | — |
| $H_2O$ | 14.70 |
| | 100.69% |

Other commercially available hectorite clays which may be used in accordance with the invention include "Hectorite Clay" a natural hectorite available from NL Industries; "Macoloid", a purified hectorite available from NL Industries and "Bentone EW", a beneficiated hectorite available from NL Industries.

By "natural" hectorite, we mean hectorite as it is mined. Typically such "natural" hectorite may comprise from around 40–60% hectorite and 40–60% other minerals.

Use of the phase purified hectorite in the disclosure and claims signifies a hectorite which, via processing, has had all or most of the non-clay components removed. This includes those hectorites which have been subjected to a drying step.

The phrase beneficiated hectorite is used herein to define hectorites that have been treated with or chemically reacted with organic or other chemical treatments.

Of course, those skilled in the art may be capable of developing a purely synthetic hectorite. Such synthetic hectorites also fall within the ambit of the invention.

We have surprisingly found that use of the hectorite clays results in effective paint detackification of many different paint types. Surprisingly, such hectorite clay detackifier products work much better than the prior art montmorillonites and bentonites. Although we do not intend to be bound by any particular theory of operation, it is postulated that the enhanced detackification efficacy is caused by the remarkable expansion capacity exhibited by hectorites.

Moreover, hectorite is more versatile than the other clays mentioned above in that it performs its detackification function with respect to a wide variety of paint types, and is especially effective in detackifying epoxy, polyurethane and vinyl resin paints which are difficult to detackify.

In combination with the hectorite clay, it is preferred to use an antifoaming agent such as a polyoxylkylene glycol or a silicone material so as to minimize foaming problems that may occur. In order to provide an effective yet inexpensive treatment, montmorilonite clays may be combined with the more expensive hectorite clay. Other materials such as alumina may also be added.

Compositions in accordance with the invention may comprise: (the percentages adding up to 100%)

10-100 weight % hectorite clay
01-60 weight % montmorillonite clay (when present)
01-25 weight % alumina (when present)
01-5 weight % antifoam (when present)

At present, the composition preferred for use comprises:

68.2 weight % hectorite clay: (200 mesh): particle size—75 microns.
19.5 weight % montmorillonite clay
9.8 weight % aluminum oxide (325 mesh)
2.5 weight % antifoam Prior to use, the composition is first preferably slurried with water and then either shot or continuously fed to the spray system in an amount of about 0.5–50% by weight dry composition based on the weight of the oversprayed paint. The composition may also be added to the desired paint spray booth system in its dry powder form. Most preferably, the composition is added to the system at a rate of from about 1–15% by weight dry composition to weight oversprayed paint.

We have found that optimal results are attained when the dry composition is subjected to high-shear agitation upon mixing with water. If such high-shear agitation is not available, it is recommended that the composition be allowed to stand for about 24 hours after being mixed with water. Also, it is beneficial if the water in the wash system is maintained at or near a neutral pH (i.e., $\approx$6-8).

The following examples amply demonstrate that the compositions of the present invention may be successfully utilized in processes of the type which are directed toward the inhibition of pollution and/or contamination in paint spray booth systems. In these types of water wash systems, the water is used to wash air in the booth and to remove oversprayed paints, enamels or lacquers. Solids may be removed by conventional techniques via filters, etc. The water is normally recirculated so that it may once again perform its intended washing function. Upon treatment with the detackification compositions of the invention, the tackiness of the paints, enamels and lacquers is reduced and therefore, to the extent that these paints, enamels and lacquers are not separated from the liquid phase, they exhibit less tendency to adhere to the integral parts of the pumps, mist eliminators or sump sidewalls of the spray booths. Further, the agglomeration function of the detackification compositions facilitates removal of these waste paint solids from the water so that relatively clean water can be recirculated in the system. Another important function of the treatment of the present invention is to reduce the volume of the resultant sludge.

The detackification compositions (based upon the weight of oversprayed paint) can be admitted in the paint spray booth system at varied locations including; the sump, upstream from pumps, or at any advantageous position along the circulating water system.

The invention will now be further described with reference to a number of specific examples which are to be regarded solely as illustrative and not as restricting the scope of the invention.

SPECIFIC EMBODIMENTS

Example 1

In order to access the effectiveness of hectorite clays in detackifying paints, each of the clays listed below was prepared as a 5% weight solution in water. Then, 2 cc of each 5% clay solution were mixed with 98 cc water and 1 cc of the test paint in a jar. After this addition, the resulting mixture was agitated and then allowed to settle. The overall resulting water clarity was judged subjectively, and observations were made as to whether the paint coated the glass jar, the characteristics of the floc formed, and the approximate ratio of sunk to floating paint. Results are recorded in Tables IA and IB hereinbelow.

TABLE IA

High Solids White Paint - styrene/melamine/acrylate binder, ketone/alcohol/acetate solvent

| Clay Additive | Jar Test Results | | | | |
|---|---|---|---|---|---|
| | Floc | Coated Glass | % Sink/Float | Comments | Rating |
| montmorilonite | oily N-C | yes | 10/90 | globby beads | fair |
| montmorilonite/calcium carbonate | oily cont | yes | 70/30 | globby | poor |
| sodium montmorillonite | oily N-C | yes | 65/35 | small globs | poor |
| sodium montmorillonite | small, oily | Yes | 60/40 | small floc | fair |
| sodium montmorillonite | med, oily | Yes | 50/50 | medium floc | fair |
| sodium montmorillonite | NC | yes | 50/50 | globby | poor |
| purified hectorite | fluffy | no | 20/80 | excellent kill | excellent |
| modified organo clay | sticky | yes | — | globby, unkilled | bad |
| modified organo clay | sticky | yes | 60/40 | unkilled | poor |
| kaolin | oily, N-C | yes | | non-tacky | fair |
| hectorite | fluffy | no | 20/80 | excellent kill | excellent |
| western bentonite | small beads | yes | 20/80 | small paint beads in flocs | good |
| western bentonite | small beads | yes | 40/60 | small paint beads in flocs | good |
| western bentonite | small beads | yes | 40/60 | small beads in floc | good |
| crude kaolin | globby | yes | — | unkilled | poor |
| kaolin, ceramic, grade | globby | yes | 30/70 | unkilled | poor |
| control | globby | yes | — | unkilled | poor |

N-C means a non-continuous layer of paint
Cont. means a continuous layer of paint
% sink/float relates to the floc layer

TABLE IB

Blue Lacquer Paint - methacrylate binder, ester/mixed aromatic solvent

| Clay Additive | Jar Test Results | | | | |
|---|---|---|---|---|---|
| | Floc | Coated Glass | Sink/Float | Comments | Rating |
| montmorilonite | small | no | 0/100 | fluffy, small flocs | good |
| montmorilonite/calcium | beady, cont | yes | 5/95 | globby, oily | poor |

TABLE IB-continued

Blue Lacquer Paint - methacrylate binder, ester/mixed aromatic solvent

| Clay Additive | Floc | Coated Glass | Sink/Float | Comments | Rating |
|---|---|---|---|---|---|
| carbonate | | | | | |
| sodium montmorillonite | fluffy | no | 0/100 | small, fluffy floc | good |
| sodium montmorillonite | fluffy | no | 0/100 | small, fluffy floc | v. good |
| sodium montmorillonite | small | no | 0/100 | moderate foam | good |
| sodium montmorillonite | fluffy | yes | 0/100 | moderate foam | good |
| purified hectorite | fluffy | no | 0/100 | small, fluffy floc | excellent |
| modified organo-clay | globby | yes | — | all paint stuck to glass | v. bad |
| modified organo-clay | beady | no | 0/100 | continuous layer | fair |
| Kaolinite | beady-N-C | no | 10/90 | non-continuous layer | good |
| hectorite | fluffy | no | 0/100 | wide floc layer | excellent |
| western bentonite | | no | 2/98 | clay/paint separation | good |
| western bentonite | small | no | 0/100 | fluffy, | good |
| | | no | 20/80 | small clay/paint separation | good |
| western bentonite | globby, cont | no | 5/95 | small globs | fair |
| crude kaolin | beady | yes | | unkilled, cont. | poor |
| kaolin ceramic grade | beads | yes | 0/100 | oily, continuous | poor |
| control | globby | yes | 0/100 | oily, continuous | poor |

Example 2

Another series of jar tests was performed with the clays, talcs, zeolites and silicates listed below being used as detackifying agents. The procedure used in Example 1 was repeated. This time, however, foaming propensity was measured on a subjective 1 to 5 scale with #1 signifying worse than control, #2 signifying control, and #5 indicating a lack of foam formation. Floc depth was measured (in milliliters) as opposed to the subjective sink/float ratio used in Example I. In addition to the other subjective characteristics measured in conjunction with Example 1, a "finger test" was performed in which the tester's finger was placed in the formed floc and then visual and tactile observations recorded. All results appear in Tables IIA-C. As used herein, Composition "A" refers to a composition consisting of 68.2 weight % hectorite, 19.5 weight % montmorillonite, 9.8 weight % aluminum oxide, and 2.5% polyoxylalkylene glycol antifoam.

TABLE IIA

BROWN PAINT - melamine modified alkyd binder, ethylene glycol monoethylether acetate solvent

| Detackifying Agent | Floc Description | Foam | Float Sink (MM) | Finger Test | Coating on Jar |
|---|---|---|---|---|---|
| Composition "A" | Fluffy, small beads | 1 | 5/11 | oily, smears non-tacky | None |
| natural hectorite | Fluffy, small beads | 1 | 12/18 | oily, smears non-tacky | None |
| purified hectorite | Fluffy, small beads | 1 | 11/34 | Oily, smears non-tacky | None |
| modified organo-clay | Oily, continuous | 5 | 2/0 | Greasy non-tacky | None |
| beneficiated hectorite | Fluffy, small beads | 1 | 18/25 | Slightly rollable | None |
| modified organo-clay | Globby, non-continuous | 5 | —/— | Not killed | Yes |
| modified organo-clay | Globby, non-continuous | 5 | —/— | Not killed | Yes |
| modified organo-clay | Globby, non-continuous | 5 | —/— | Not killed | Yes |
| sodium silicon aluminate | Oily, continuous | 5 | 2/0 | Smears | Yes |
| hydrated silicon dioxide | Oily, continuous | 5 | 2/1 | Smears | Yes |
| attapulgite clay | Fine, beady, continuous | 5 | Beady layer/3 | Unkilled | Minimal |
| attapulgite clay | Oily, globby, non-continuous | 5 | —/thin layer | Unkilled | Continuous |
| talc | Small beady & flaky | 4 | 2/1 | Oily | Yes |
| talc | Medium beady floc | 4 | 2/1 | Oily | Yes |
| talc | Beady | 5 | 2/1 | Oily layer on bottom | No |
| talc | Beady | 5 | 2/1 | Oily layer on bottom | No |
| zeolite sieve | Oily, non-continuous | 5 | 1/1 | Dispersion | Yes |
| zeolite sieve | Oily, non-continuous | 5 | 1/1 | Dispersion | Yes |
| zeolite | Oily, non-continuous | 5 | 0/2 | Dispersed | Yes |
| zeolite | Oily, non-continuous | 5 | 0/2 | Dispersed | Yes |
| hollow, inorganic microsphere | Continuous, globby | 5 | 2/0 | Heavy coating | Yes |
| hollow, inorganic microsphere | Continuous, globby | 5 | 2/0 | Heavy coating | Yes |
| hollow, inorganic microsphere | Continuous, globby | 5 | 3/0 | Heavy coating | Yes |
| activated bauxite | Medium beady floc | 5 | 0/2 | Dispersion | Yes |

TABLE IIB

RED/BROWN PRIMER - melamine modified epoxy binder, alcohol/acetate/mixed aromatics solvent

| Detackifying Agent | Floc Description | Foam | Float Sink (MM) | Finger Test | Coating on Jar |
|---|---|---|---|---|---|
| Composition "A" | Fluffy, tiny beads in floc | 1 | 9/2 | Smears, non-tacky | No |

TABLE IIB-continued

RED/BROWN PRIMER - melamine modified epoxy binder, alcohol/acetate/mixed aromatics solvent

| Detackifying Agent | Floc Description | Foam | Float Sink (MM) | Finger Test | Coating on Jar |
|---|---|---|---|---|---|
| hectorite | Fluffy, tiny beads in floc | 1 | 10/2 | Smears, No non-tacky | |
| purified hectorite | Fluffy, tiny beads in floc | 1 | 20/3 | Rollable | No |
| modified organo-clay | Beady, flaky flocs | 5 | 4/1 | Greasy, non-tacky | Yes |
| beneficiated hectorite | Fluffy, tiny beads in floc | 1 | 22/2 | Rollable, non-tacky | No |
| modified organo-clay | Globby, non-continuous | 5 | —/— | Tacky | Yes |
| modified organo-clay | Globby, non-continuous | 5 | —/— | Tacky | Yes |
| modified organo-clay | Small globs, non-continuous | 5 | —/— | Tacky | Yes |
| sodium silicon aluminate | Beady, continuous | 5 | 2/1 | Oily | Yes |
| hydrated silicon dioxide | Beady | 4 | 3/1 | Oily | Yes |
| talc | Fluffy floc | 4 | 3/2 | Oily | Slight |
| talc | Fluffy floc | 4 | 3/1 | Oily | Non-continuous |
| talc | Globby continuous | 5 | 3/1 | Oily | Yes |
| talc | Globby continuous | 5 | 3/1 | Oily | Yes |
| zeolite sieve | Beady & globby | 5 | 1/1 | — | Yes |
| zeolite sieve | Tiny beads & globby | 5 | 1/1 | — | Yes |
| zeolite | Beady, continuous | 5 | 2/0 | Globby, smears | Yes |
| zeolite | Beady, continuous | 5 | 2/0 | — | Yes |
| hollow, inorganic microsphere | Beady, globby | 5 | 2/0 | Greasy | Yes |
| hollow, inorganic microsphere | Beady, globby | 5 | 2/1 | Greasy | Yes |
| hollow, inorganic microsphere | Beady, globby | 5 | 2/1 | Greasy | Yes |
| activated bauxite | Beady, globby | 5 | 1/1 | Oily layer on bottom | Yes |

TABLE IIC

CAMEL TAN - melamine modified alkyd/styrene binder, ethylene glycol monethyl ether acetate/mixed aromatics solvent

| Adsorbant | Floc Description | Foam (1–5) | Float Sink (MM) | Class II | Coating on Jar |
|---|---|---|---|---|---|
| Composition "A" | Fluffy with tiny beads | 1 | 3/38 | Oily, coats finger, non-tacky | No |
| hectorite | Fluffy with tiny beads | 1 | 3/20 | Oily, coats finger, non-tacky | No |
| purified hectorite | Fluffy with tiny beads | 1 | 7/55 | Non-tacky, light coating | No |
| modified organo-clay | Continuous with some beads | 5 | —/— | Coats finger, non-tacky | Yes |
| beneficiated hectorite | Fluffy with tiny beads | 1 | 22/32 | Non-tacky, light coating | No |
| modified organo-clay | Oily, globby, non-continuous | 5 | 1/0 | Oily, non-tacky | Yes |
| modified organo-clay | Oily, globby, non-continuous | 5 | 1/0 | Oily, non-tacky | Yes |
| modified organo-clay | Beady, flaking | 5 | 2/0 | Oily, non-tacky | Yes |
| attapulgite clay | Oily, non-continuous | 5 | —/— | Oily, non-tacky | Yes |
| attapulgite clay | Oily, non-continuous | 5 | —/— | Oily, non-tacky | Yes |

Discussion Tables I and II

The hectorite clays are clearly the best paint detackifiers/dispersants of the materials evaluated. The montmorillonite clays were somewhat efffective, but not nearly as effective as the hectorite clays. All of the other tested products were ineffective.

Quite surprisingly, the hectorite products appeared to work well on all of the paint samples tested. It is noted that all of the tested hectorite samples exhibited a tendency to foam. Hence, Composition "A" was developed so as to formulate a hectorite based detackifier with an antifoam component.

Example 3

In order to ascertain the detackification efficacy of the antiforam containing hectorite product, another series of jar tests, as per Examples 1 and 2, was undertaken. This time, the hectorite product was compared to other commercially available, well-known detackifier products. Results are shown in Tables IIIA–C.

TABLE IIIA

Red/Brown Primer - melamine modified epoxy binder, alcohol/acetate/mixed aromatics solvent

| Product/ Paint | Foam* | Coating on Jar* | Floc Depth (mm) | Floc Description | Finger Test | Treatment Rating (per paint) |
|---|---|---|---|---|---|---|
| Composition "A" | 3 | 5 | 4 | fluffy floc, slight tack, no beads of paint, easily disperses, medium floc | light coat, overall not oily, does not smear | good, best |
| montmorillonite | 4 | 5 | 2 | very fine floc, easily disperses, unused clay | light coat, slight tack, not oily, does not | good |

TABLE IIIA-continued

Red/Brown Primer - melamine modified epoxy binder, alcohol/acetate/mixed aromatics solvent

| Product/Paint | Foam* | Coating on Jar* | Floc Depth (mm) | Floc Description | Finger Test | Treatment Rating (per paint) |
|---|---|---|---|---|---|---|
| montmorillonite/calcium carbonate | 5 | 3 | 4 | on bottom medium floc with chunks of paint | smear heavy coat, smears on glass | poor |
| diatomaceous earth | 5 | 4 | 2 | medium floc with chunks of paint | medium coat, oily, tacky | fair |
| Control | 5 | 2 | 0 | chunky, unkilled | oily, heavy coat, unkilled | poor |

TABLE IIIB

Silver - acrylic modified polyester binder, alcohol/acetate/acetone solvent

| Product/Paint | Foam* | Coating on Jar* | Floc Depth (mm) | Floc Description | Finger Test | Treatment Rating (per paint) |
|---|---|---|---|---|---|---|
| Composition "A" | 4 | 5 | 13 | fluffy, easily disperses, fine particle size, small beads of paint in floc | light coating on finger, no smear on glass, oily | good-best overall |
| montmorillonite | 5 | 5 | 3 | floc easily disperses, medium size floc | medium coat on finger, oily | good |
| montmorillonite | 5 | 3 | 0 | terrible, chunks of paint on bottom | unkilled, oily, tacky | bad |
| diatomaceous earth | 5 | 4 | 1 | medium flocs with chunks of paint | unkilled, oily, tacky | poor |
| Control | 5 | 1 | 0 | continuous layer | unkilled, | bad |

TABLE IIIC

GREY PRIMER (high solids)

| Product/Paint | Foam* | Coating on Jar* | Floc Depth (mm) | Floc Description | Finger Test | Treatment Rating (per paint) |
|---|---|---|---|---|---|---|
| Composition "A" | 4 | 5 | 11 | fluffy, easily disperses, fine particle size, small beads of paint in floc | light coat on finger, not oily, no smear | good-best results |
| montmorillonite | 4 | 5 | 4 | medium size floc with large beads of paint, cloudy H₂O | medium coat, not oily, smeared on jar | good |
| montmorillonite/calcium carbonate | 5 | 3 | 0 | chunks of paint floating | greasy, heavy coat | poor |
| diatomaceous earth | 5 | 4 | 2 | beads of paint, no real flocs | oily, unkilled, not tacky | fair |
| Control | 5 | 3 | 0 | continuous glob on bottom | greasy, not killed | poor |

*Rating as follows: 0 = very heavy; 5 = none at all. All numbers in between represent degrees of 0 to 5.

It is apparent from the examples that the hectorite detackification agents of the invention provide excellent results in conjunction with a variety of differing paint types.

In accordance with the patent statutes, the best mode of practicing the invention has been herein set forth. However, it will be apparent to those skilled in the art that many modifications can be made without departing from the spirit of the invention. It is to be understood that the scope of the invention is to be limited solely by the scope of the appended claims.

We claim:

1. A process for controlling pollution and contamination in paint, lacquer or enamel spray booths in which water is used to wash air in said booth and to remove over-sprayed paints, enamels or lacquers, said water being recirculated for further use in washing the air in said spray booths, said process comprising adding to said water an effective amount for the purpose of a detackifying composition consisting essentially of a hectorite clay having the empirical formula $[Mg_{2.67}Li_{0.33}(Na_{0.33})]Si_4O_{10}(OH,F)_2$, said amount being sufficient to reduce the tackiness of said paints, enamels and lacquers and to thereby reduce the tendency of oversprayed paints, enamels and lacquers to adhere to pump parts, mist eliminators, or sump sidewalls of said spray booths, said composition being effective to condition paint, enamel and lacquer solids so as to facilitate removal of said solids from said water.

2. Process as recited in claim 1 wherein said composition is added to said water at a rate of between about 0.5-50% by weight based upon the weight of said oversprayed paint, enamel or lacquer.

3. Process as recited in claim 2 wherein said composition is added to said water at a rate of between about 1-15% by weight based upon the weight of said oversprayed paint, enamel or lacquer.

4. Process as recited in claim 1 wherein said hectorite clay is a member selected from the group consisting of natural hectorite clay, purified hectorite clay, beneficiated hectorite clay synthetic hectorite clay and mixtures thereof.

* * * * *